No. 701,569. Patented June 3, 1902.
E. F. ISRAEL.
SEED PLANTER.
(Application filed Apr. 23, 1900.)

(No Model.)

Witnesses

Inventor
Elijah F Israel
By N. B. Hagin atty.

THE NORRIS PETERS CO., PHOTO-LITHO., WASHINGTON, D. C.

UNITED STATES PATENT OFFICE.

ELIJAH F. ISRAEL, OF WICHITA, KANSAS, ASSIGNOR OF ONE-HALF TO R. C. ISRAEL AND GEORGE W. ISRAEL, OF WICHITA, KANSAS.

SEED-PLANTER.

SPECIFICATION forming part of Letters Patent No. 701,569, dated June 3, 1902.

Application filed April 23, 1900. Serial No. 14,034. (No model.)

*To all whom it may concern:*

Be it known that I, ELIJAH F. ISRAEL, a citizen of the United States of America, residing at Wichita, in the county of Sedgwick and State of Kansas, have invented certain new and useful Improvements in Seed-Planters, of which the following is a specification, reference being had therein to the accompanying drawings, and the figures of reference thereon, forming a part of this specification, in which—

Figure 1:
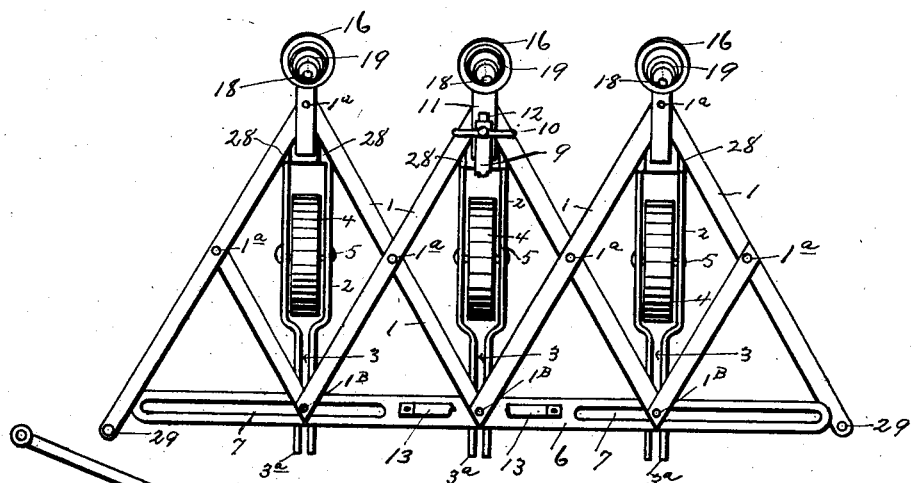
Figure 2:
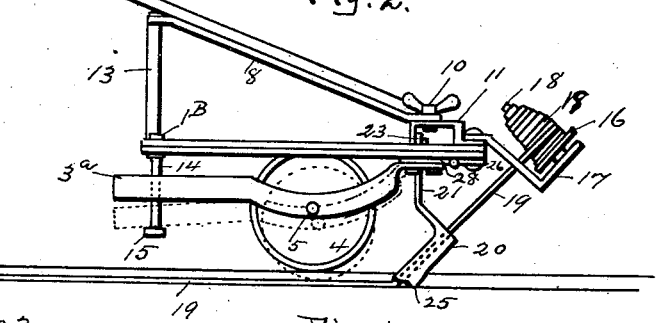
Figure 3:
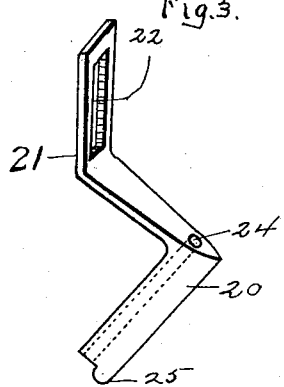
Figure 4:
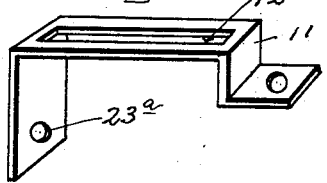
Figure 5:
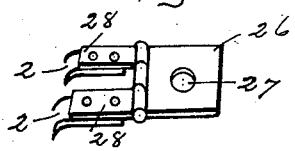

Figure 1 is a top plan of my improved seed-planter. Fig. 2 is a side view of the same. Fig. 3 is a detail perspective of the adjustable plow and furrow-opener or blade. Fig. 4 is a detail perspective view of the adjusting portion of the planter-frame. Fig. 5 is a perspective view of the hinge to which is secured the frame $3^a$.

This invention relates to certain improvements in seed-planters; and it consists in the construction of the same; and the object of my invention is to produce a seed-planter adapted to plant seeds when twisted in a long strip of narrow paper, as covered by Patent No. 647,448.

Referring to the drawings, 1 represents a laterally-adjustable frame secured together at $1^a$ and $1^B$. 2 represents a yielding frame which is divided at 3 and has the two extending arms $3^a$. 4 represents wheels journaled in said frames at 5. 6 represents a cross-bar secured across the rear end of said frame 1. 7 represents slots in either end of said cross-bar. 8 represents a brace, to which is secured the handle 9. 10 represents a thumb-screw for adjustably securing one end of said brace 8 to the frame 1 through the medium of the bracket 11, having the slot 12.

13 represents braces secured to the crosspiece 6, to which is secured one end of the brace 8.

14 represents a downwardly-extending arm secured to the frame 1 at $1^B$, which passes between the arms $3^a$. Said arm 14 is provided with the head on the lower end 15 to prevent the arms $3^a$ from slipping off the end of said arm 14.

16 represents a reel which is sleeved on the post 18, which is secured to the support 17.

19 represents the long strip of narrow paper, in which seeds are placed at desired intervals, as covered by Patent No. 647,448.

20 represents the plow and furrow-opener or blade, which is provided with the arm 21, having the slot 22. Said arm 21 is vertically adjustably secured to the bracket 11 by the bolt 23 passing through said slot 22 and the hole $23^a$ in said bracket 11. 24 represents an opening lengthwise through said plow and furrow-opener or blade 20, through which said strip of paper with seeds placed therein passes.

25 represents the plow-blade, extending somewhat below the point where the paper leaves said furrow-opener or blade.

26 represents a hinge which is secured at 27 to the forward under portion of said frame 1. 28 represents said hinge provided with two arms, to which is secured the forward end of the frame 2.

29 represents holes in the ends of the frame 1, in which is placed a marker for marking the ground.

This seed-planter is operated in the following manner: A reel of paper containing seeds, as described in Patent No. 647,448, is placed on the post 18. One end of said strip of paper is passed through the hole 24 in the plow and furrow-opener or blade 20. Said blade can be adjusted to deposit the seeds to any desired depth by loosening the bolt 23 and raising or lowering the blade, the bolt sliding through the slot 22. The plow-blade 25 will cut the channel and the seed-strip will be fed and lie in the furrow, as shown in Fig. 2. The frame 2 is secured at one end to the hinge 28 at 26, which will allow the wheel 4 to rise or drop to ride on uneven ground, as shown by the dotted lines in Fig. 2. The post or arm 14 holds said frame $3^a$ in place to prevent lateral play. The frame 1 can be adjusted to a greater or less width by loosening the thumb-screw 10, which will allow the frame 1 at the forward end to slide forward or backward, the thumb-screw passing through the slot 12, and as said frame is journaled at all connections $1^a$ and $1^B$ the two outer wheels will be carried farther from the center wheel when said thumb-screw is drawn near the inner end of said slot 12, as shown in Figs. 1 and 2, and said wheels are drawn closer together when said thumb-screw is slipped to the opposite end of said slot 12. When said frame 1 is being made longer or shorter, said journal connections 1^B will slide in the slots 7.

The furrow-opener or blade and reel may be used with a one-wheel planter or a planter of different general construction.

Having thus described my invention, what I claim as new and useful, and desire to secure by Letters Patent, is as follows:

1. In the herein-described seed-planter, a plow and furrow-opener or blade combined, vertically secured adjustably to the planter-frame, said blade having a hole lengthwise through the lower end, a reel for carrying a long strip of paper with seeds placed therein, and sleeved on a post secured to said planter-frame, said long strip of paper with seeds adapted to pass through said hole in said plow and furrow-opener or blade into the furrow.

2. The combination of a seed-planter frame, a vertically-adjustable plow and furrow-opener or blade, having a hole lengthwise thereof, a laterally-adjustable frame, wheels on which said seed-planter rides journaled in a yielding frame, a reel sleeved on a post secured to said adjustable frame, a long strip of narrow paper with seeds twisted therein at desired intervals, wound on said reel, said paper adapted to pass through said hole in said plow and furrow-opener or blade into the furrow.

ELIJAH F. ISRAEL.

Witnesses:
GEO. W. ISRAEL,
FRED. BURGESSER.